E. M. BROWN.
FENDER.
APPLICATION FILED OCT. 12, 1917.

1,267,966.

Patented May 28, 1918.
2 SHEETS—SHEET 1.

Witness
C. H. Leeser Jr.
P. M. Smith.

Inventor
E. M. Brown,
By Victor J. Evans
Attorney

E. M. BROWN.
FENDER.
APPLICATION FILED OCT. 12, 1917.
1,267,966.
Patented May 28, 1918.
2 SHEETS—SHEET 2.
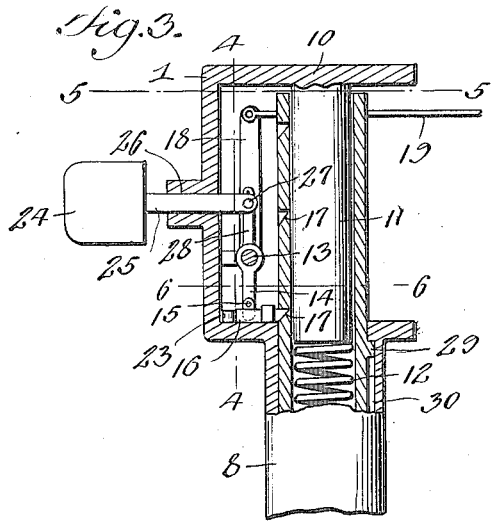
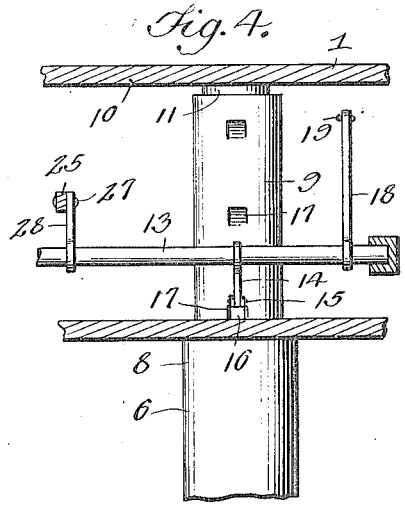
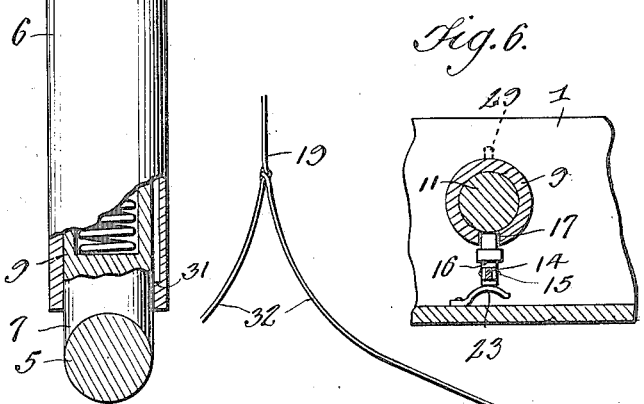
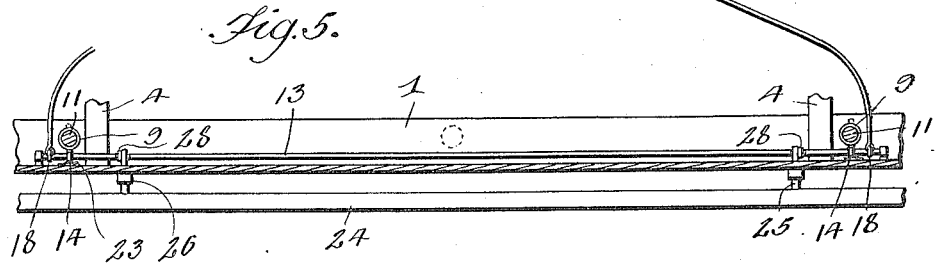
Inventor
E. M. Brown,
By Victor J. Evans
Attorney
Witness

UNITED STATES PATENT OFFICE.

ELLIS MONROE BROWN, OF ROANOKE, VIRGINIA.

FENDER.

1,267,966.  Specification of Letters Patent.  Patented May 28, 1918.

Application filed October 12, 1917. Serial No. 196,251.

*To all whom it may concern:*

Be it known that I, ELLIS M. BROWN, a citizen of the United States, residing at Roanoke, in the county of Roanoke and State of Virginia, have invented new and useful Improvements in Fenders, of which the following is a specification.

This invention relates to fenders, the object in view being to produce a fender particularly adapted for use upon street cars and motor vehicles.

One of the principal objects of the invention is to produce a fender which will be sightly and attractive in appearance and which is of a telescopic character so that ordinarily it will occupy a comparatively small space and provide ample road clearance.

A further object of the invention is to produce a fender comprising, in connection with a main bumper bar, a vertically slidable bar, connected with the main bar by telescopic connecting members, combined with means for automatically thrusting the slidable section of the fender downwardly to a fully extended position, means being provided for automatically tripping the fender, also manually controlled means for tripping and setting the fender when the occasion therefor becomes necessary.

With the above and other objects in view, the invention consists in the novel construction, combination and arrangement of parts, herein described, illustrated and claimed.

In the accompanying drawings:—

Fig. 3 is an enlarged vertical fore and aft section through the fender.

Fig. 4 is a section on the line 4—4 of Fig. 3.

Fig. 5 is a section on the line 5—5 of Fig. 3 showing the tripping connections.

Fig. 6 is a fragmentary horizontal section on the line 6—6 of Fig. 3.

The improved fender comprises a main horizontal bumper bar 1 extending in front of the vehicle and projecting at its ends beyond the front wheels 2 of the machine. The bar 1 is secured to the frame bars 3 of the vehicle by means of attaching clips 4.

Figure 1:
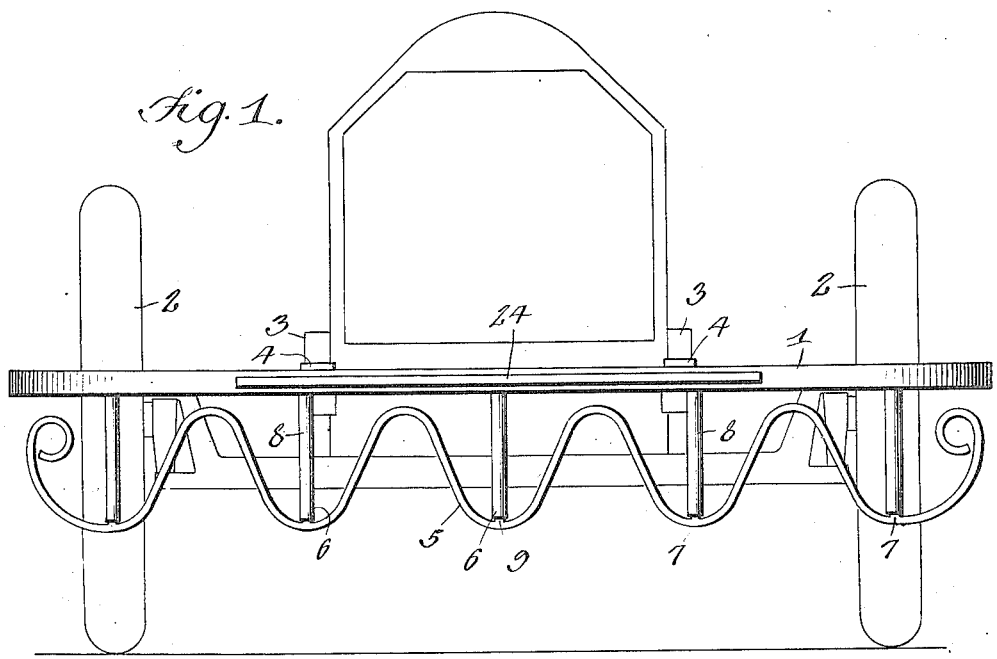
Figure 1 is a front elevation of a sufficient part of a motor vehicle to illustrate the improved fender in its applied relation thereto.
Figure 2:
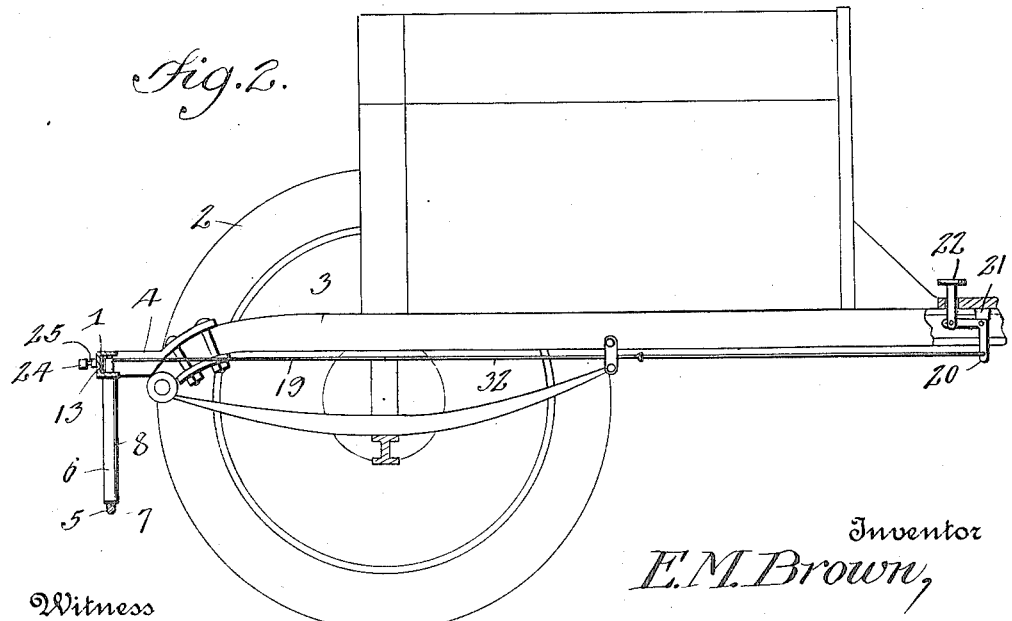
Fig. 2 is a side elevation of the same with the fender in section.

Arranged under the bar 1 is a bottom fender bar 5 of serpentine formation and connected to the top bar 1 by telescopic bars 6 each of which is connected at its lower end at the point 7 to the lowest portions of the bottom bar 5, the upwardly extending portions of the bar 5 being arranged between the connecting members or bars 6 as clearly shown in Fig. 1. By making the bottom bar 5 of serpentine formation, no large spaces or openings are left in the body of the fender, thus giving better protection to the person struck or picked thereby.

Each of the connecting members or bars 6, as shown in Fig. 3, comprises an outer tubular member 8 and an inner tubular member 9, the member 9 being attached to the bottom fender bar 5. The bar 8 is connected directly to the main bumper bar 1. Extending downwardly from the top wall 10 of the main bumper bar which is of channel iron construction as shown in Fig. 3, are depending studs or guides 11 which are received in the upper ends of the adjacent inner tubular members 9 of the vertical connecting bars 6. Arranged within the inner tubular bars 9 are thrust springs 12 the upper ends of which bear against the bottom ends of the guides or studs 11, said springs serving to thrust the members 9 and the bottom bar 5 downwardly when the tubular members 9 are released.

The means for holding the tubular bars 9 in their telescoped position, comprises a rock shaft 13 which is journaled in bearings within the main bumper bar 1 and has extending therefrom trip arms 14 which have a jointed connection at 15 with a pair of slidable latches 16 movable into and out of engagement with notches 17 in the adjacent tubular members 9 as shown in Fig. 3. An operating arm 18 extends upwardly from the rock shaft 13 and has attached thereto an operating connection 19 such as a rod or cable which extends rearwardly and is attached at its rear extremity to a bell crank lever 20 pivotally supported by a lug 21 under the floor of the vehicle and operable by means of a pedal 22 within convenient reach of the operator of the vehicle who may thereby trip and release the extensible part of the fender to set the same in its useful position. Several sets of notches 17 are provided in order that the slidable section of the fender may be supported at different elevations according to the make of motor vehicle in conjunction with which the fender is used. Each of the latches 16 is yieldingly held in engagement with the respective tubular member 9 by means of a spring 23 which serves to automatically thrust the latch into engagement with the adjacent member 9 as the lower part of the fender is raised.

Located in front of the main bumper bar 1 is a trip rail 24 having rearwardly extending plungers 25 which are slidable through guideways 26 in the front of the main bumper bar 1, said plungers being connected by pivots 27 to arms 28 extending upwardly from the rock shaft 13. The downward movement of each member 9 is limited by means of a stop lug 29 projecting from the member 9 and working in a groove 30 on the inner side of the outer tubular member 8 as shown in Fig. 3, said stop lug 29 coming in contact with the stop shoulder 31 formed by the lower end of the groove 30. The connection 19 is formed with two branches 32 as shown in Fig. 5 which are attached to the arms 18 of the rock shaft 13.

From the foregoing description taken in connection with the accompanying drawings it will now be seen that the fender may be tripped either by the operator or by means of the trip rail 24 coming in contact with a person. As soon as the fender is tripped, the bottom bar 5 and the tubular members 9 of the telescopic connections are quickly thrust downwardly to the limit of their movements by means of their springs 12. On account of the formation of the extensible portion of the fender, the person struck by the fender will be prevented from getting under the machine or being run over by the wheels of the vehicle. When the fender is in its folded position as shown in Fig. 1, ample road clearance is given and the fender occupies only about one-half of the space which it occupies when in its fully extended and useful position. The construction of the fender is simple and inexpensive and insures the proper and quick operation thereof.

I claim:—

1. In a fender, the combination of a main horizontal bumper bar, attaching means for securing said bar to the frame of a vehicle, a bottom bar of serpentine formation, telescopic bars connecting said top and bottom bars, thrust springs housed within said telescopic bars and serving to thrust the bottom bar downwardly, latches engaging portions of said telescopic bars to hold the bottom bar in an elevated position, and tripping means for operating said latches.

2. In a fender, the combination of a main horizontal bumper bar, attaching means for securing said bar to the frame of a vehicle, a bottom bar of serpentine formation, telescopic bars connecting said top and bottom bars, thrust springs housed within said telescopic bars and serving to thrust the bottom bar downwardly, latches engaging portions of said telescopic bars to hold the bottom bar in an elevated position, and tripping means for operating said latches, said tripping means comprising a trip rail positioned in front of the main bumper bar and operatively connected with said latches.

3. In a fender, the combination of a main horizontal bumper bar, attaching means for securing said bar to the frame of a vehicle, a bottom bar of serpentine formation, telescopic bars connecting said top and bottom bars, thrust springs housed within said telescopic bars and serving to thrust the bottom bar downwardly, latches engaging portions of said telescopic bars to hold the bottom bar in an elevated position, and tripping means for operating said latches, said tripping means comprising a foot lever, and connecting means between said foot lever and latches.

4. In a fender, the combination of a main horizontal bumper bar, attaching means for securing said bar to the frame of a vehicle, a bottom bar of serpentine formation, telescopic bars connecting said top and bottom bars, thrust springs housed within said telescopic bars and serving to thrust the bottom bar downwardly, latches engaging portions of said telescopic bars to hold the bottom bar in an elevated position, tripping means for operating said latches, said tripping means comprising a foot lever, and connecting means between said foot lever and latches.

5. In a fender, the combination of a main horizontal bumper bar, attaching means for securing said bar to the frame of a vehicle, a bottom bar of serpentine formation, telescopic bars connecting said top and bottom bars, thrust springs housed within said telescopic bars and serving to thrust the bottom bar downwardly, latches engaging portions of said telescopic bars to hold the bottom bar in an elevated position, tripping means for operating said latches, said tripping means comprising a rock shaft, arms thereon having a jointed connection with said latches, an operating arm extending from said rock shaft, and means for turning said rock shaft.

In testimony whereof I affix my signature.

ELLIS MONROE BROWN.